United States Patent
Lathia (10) Patent No.: US 10,628,788 B1
(45) Date of Patent: Apr. 21, 2020

(54) DYNAMIC ENCUMBRANCE OF INVENTORY

(71) Applicant: Amazon Technologies, Inc., Reno, NV (US)

(72) Inventor: Bhavnish H. Lathia, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 592 days.

(21) Appl. No.: 14/072,669

(22) Filed: Nov. 5, 2013

(51) Int. Cl.
| | | |
|---|---|---|
| *G06Q 10/00* | (2012.01) | |
| *G06Q 30/06* | (2012.01) | |
| *G06Q 10/08* | (2012.01) | |

(52) U.S. Cl.
CPC .................................. *G06Q 10/087* (2013.01)

(58) Field of Classification Search
CPC ............................... G06Q 10/00; G06Q 30/06
USPC .......................................................... 705/28
See application file for complete search history.

(56) References Cited

U.S. PATENT DOCUMENTS

| | | | | |
|---|---|---|---|---|
| 2009/0138384 | A1* | 5/2009 | McCormick | G06Q 10/0637 705/28 |
| 2014/0172537 | A1* | 6/2014 | Weigman | G06Q 30/0213 705/14.35 |
| 2015/0066570 | A1* | 3/2015 | Hellen | G06Q 10/087 705/7.25 |

* cited by examiner

*Primary Examiner* — Russell S Glass
(74) *Attorney, Agent, or Firm* — Lee & Hayes, P.C.

(57) ABSTRACT

This disclosure is directed at least in part to dynamically determining triggering events and/or an amount of time to encumber inventory of an item. By encumbering inventory, the inventory of the item is made unavailable, at least temporarily, to other customers. Encumbrance may be based on one or more factors, which may include current on-hand inventory and/or a rate of sales for the item. However, many other factors may also be used in various combinations. Inventory of items may be encumbered for a dynamically determined amount of time. At the end of this time, the item may be released and made available to other customers assuming the item was not purchased in a completed transaction. The dynamic determination of the triggering event and the dynamic determination of an amount of time to encumber items may be deployed individually or in combination with each other.

20 Claims, 6 Drawing Sheets

DYNAMIC ENCUMBRANCE OF INVENTORY

BACKGROUND

When interacting with brick-and-mortar merchants, customers often obtain items in a physical location and then pay for the items prior to leaving the merchant's location. For these merchants, an inventory of items is often updated sometime following completion of a transaction involving the item. For example, the merchant may run a batch process at the end of the day to update inventory counts for all items. However, inventory counts may be updated more frequently, such as immediately after the completion of a transaction.

When interacting with fulfillment-based merchants, customers may rely on the merchants to fulfill the items because some or all of the items cannot be immediately obtained by customers. Fulfillment merchants may include electronic marketplaces, merchants that deliver items and warehouse fulfillment merchants that "showroom" items. For fulfillment-based merchants, inventory may be adjusted, at least temporarily, prior to completion of a transaction. Since customers of fulfillment-based merchants do not have an item in-hand, management of inventory control could result in a user proceeding with a transaction of an item that is indicated as in-stock, but turns out to be out-of-stock by the time the transaction is complete, resulting in a poor customer experience. Therefore, fulfillment-based merchants often encumber inventory of an item after occurrence of a pre-designated event that occurs before or immediately after completion of a transaction, regardless of other factors, thereby preventing, at least temporarily, the item from being purchased by another customer.

Encumbering inventory too early in a process may result in lost or missed sales where an item is made unavailable to other customers who may desire to purchase the item. Encumbering inventory too late in a process may result in a poor customer experience, as indicated above, because a customer's expectation to receive an item may not be fulfilled or upheld by the merchant.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed at least in part to dynamically determining events and/or an amount of time to encumber inventory of an item (e.g., goods, services, digital content, etc.). By encumbering inventory, the inventory of the item is made unavailable, at least temporarily, to other customers. For example, a difference between a total quantity inventory and a total quantity in available inventory may be a quantity of encumbered inventory. Merchants encumber inventory in an attempt to avoid completing a transaction with a customer for an item and then not having inventory to enable fulfillment of the purchased item to the customer. Items may be encumbered at various different points during a transaction or other interaction with a customer. Encumbrance of inventory may occur early, such as upon initial selection of an item or after a user views an item. Encumbrance of inventory early in a process is referred to herein as pessimistic encumbrance, which tries to avoid a situation of lacking inventory that is used to fulfill an item from a completed transaction. On the other hand, encumbrance of inventory late in a process is referred to herein as optimistic encumbrance, which attempts to avoid missed or lost sales due to encumbering items that are not actually sold, such as items that are later abandoned by a customer who cancels a transaction, and so forth.

As discussed herein, systems and processes may determine a triggering event that initiates encumbrance, and thus the triggering event may be frequently updated for an item based on various factors. Examples of factors include current on-hand inventory and/or a rate of sales for the item. However, as discussed below, many other factors may also be used in various combinations. In some embodiments, the inventory may be released and made available to other customers in response to various events, such as in response to a customer prematurely terminating a transaction, referred to as an abandoned transaction. Termination may be caused by user actions or user-inaction (e.g., time out, etc.).

In various embodiments, inventory of items may be encumbered for a dynamically determined amount of time. At the end of this time, the item may be released and made available to other customers assuming the item was not purchased in a completed transaction. The amount of time may be dynamically determined based on various factors, such as on-hand inventory and/or a rate of sales for the item, among other factors discussed below. The dynamic determination of the triggering event and the dynamic determination of an amount of time to encumber items may be deployed individually or in combination with each other.

The techniques and systems described herein may be implemented in a number of ways. Example implementations are provided below with reference to the following figures.

Illustrative Environment

Figure 1:
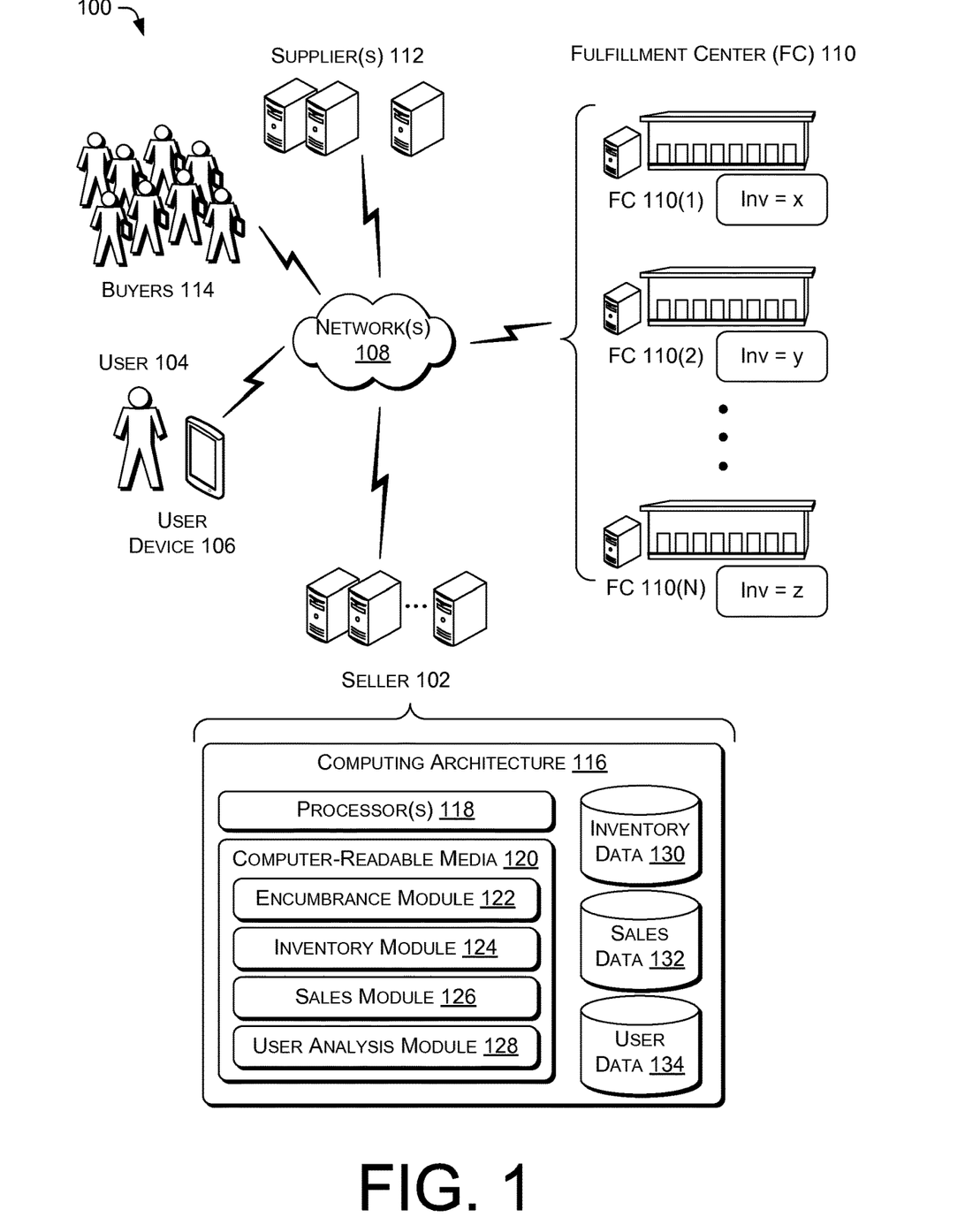
FIG. 1 is a schematic diagram of an illustrative environment to dynamically encumber inventory.

FIG. 1 is a schematic diagram of an illustrative environment 100 to dynamically encumber inventory. The environment 100 includes a seller 102 that may be a merchant, a host of an electronic marketplace, or any other entity that may receive a request for an item to be provided to a user 104 at a destination, such as the user's home or business. An item may be a physical product, a service, a digital item (e.g., ticket, music, video, electronic book, document, etc.), or anything else consumable by a user, such as by purchase, lease, rent, trade, and so forth. As discussed herein, inventory includes a right to distribute an item, were the right is governed by control of the item, by contact, etc. The distribution may include physical distribution (e.g. a product), digital distribution (e.g., transmitting a file via a download, etc.), service distribution (e.g., rendering the service, etc.), and/or any other type of distribution. In some instances, the user 104 may even pick up the item from the seller 102 or from another location. The seller 102 may process sales or other acquisitions of items to be fulfilled to the user 104. The sales may be completed by communications between the seller 102 and the user 104 via a user device 106 in communication with the seller 102 through a network 108. The network 108 may be any type of wired and/or wireless network that enables message transmission between different communication devices, such as the user device 106 (e.g., mobile telephones, computers, tablets, gaming devices, electronic book readers, etc.), servers, and/or other communication devices.

The environment 100 may also include one or more fulfillment centers (FC) 110. The fulfillment center 110 may fulfill items, including services and/or digital transmissions. In some instances, services and/or digital may have limited quantities based on licenses, rights to distribute, and so forth. Thus, the seller 102 may not be able to distribute an unlimited quantity of digital items, for example. In some embodiments, the fulfillment center 110 may be integrated with the seller 102 and may share a location with the seller 102 (e.g., attached warehouse, etc.). This is common with smaller merchants that ship items directly from their store or order processing location. In various embodiments, the fulfillment center 110 may include multiple locations, such as FC 110(1), 110(2), . . . , 110(N). The FCs 110(1)-(N) may be located in various locations that are different than the location of the seller 102 and may be managed and/or owned by a separate entity. For example, when the seller 102 is a large merchant (e.g., nationally recognized, etc.), the seller may process transactions and then send an order to one of the FCs 110(1)-(N) for order fulfillment. One of the FCs 110(1)-(N) may then obtain the items in the order, package the items into one or more packages and then initiate shipment of the package(s) through a delivery service, common courier, etc. The seller 102 may track the inventory of the FCs 110(1)-(N), which may have different inventory levels, represented in FIG. 1 as "inv=x" and so forth.

The FC 110 may receive items from various sources, represented in the environment 100 as suppliers 112. The suppliers 112 may include manufacturers, other fulfillment centers, intermediaries, and/or other providers of items. As used herein, the term "item" includes any object capable of being physically transported (e.g., shipped, fulfilled, delivered, etc.) from one location to another location. In some instances, as discussed below, the seller 102 may request that one of the suppliers 112 fulfill an item directly to the user 102 rather than fulfilling the item using the FC 110. The seller 102 may contact the suppliers 112 regarding replenishment of items at the FC 110. The seller 102 may also transact with many buyers 114 that purchase items from the seller 102 and that are fulfilled by the FC 110, or possibly in part by the supplier(s) 112.

As discussed at the outset, the seller 102 may encumber inventory of an item after occurrence of different events when conducting a transaction with the user 104. These events, called triggering events, may be dynamically determined and/or updated based on various factors discussed herein. Further, the duration of the encumbrance may by dynamically determined by the seller.

In accordance with one or more embodiments, the seller 102 may include a computing architecture 116. The computing architecture 116 may be implemented as a set of computing devices, which may include one or more computing devices implemented in a distributed or non-distributed computing environment. The computing architecture 116 may include one or more processors 118 and one or more computer readable media 120 that stores various modules, applications, programs, or other data. The computer-readable media 120 may include instructions that, when executed by the one or more processors 118, cause the processors to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 120 may store various modules, which may include an encumbrance module 122, an inventory module 124, a sales module 126, and a user analysis module 128. In addition, the computing architecture 116 may include various data, such as inventory data 130, sales data 132 and user data 134. Each of the modules is described in turn. As indicated above, the modules may be stored together or in a distributed arrangement.

The encumbrance module 122 may determine a triggering event, that when detected or initiated, causes the encumbrance module 122 to encumber inventory of an item, thereby preventing, at least temporarily, the item from being purchased by another customer. The encumbrance module 122 may determine an amount of time to encumber the item, after which the item may made available to other customers. The encumbrance module 122 may determine the triggering event and/or the amount of time based on one or more factors such as a rate of sales of an item, current on-hand inventory of an item, abandonment rates, replenishment rates, and so forth. The encumbrance module 122 may receive data from the inventory module 124, the sales module 126, and/or the user analysis module 128, which includes data related to the aforementioned factors used to determine the triggering event and/or the amount of time of encumbrance.

The inventory module 124 may analyze the inventory data 130 to determine inventory metrics that can be used as factors by the encumbrance module 122. The inventory module 122 may determine current on-hand inventory, inventory replenishment rates, inventory available from the suppliers 112 (and possibly fulfilled directly from the suppliers 112), and/or other information about inventory. In some embodiments, the inventory module 122 may perform deep inventory checks to determine a current status of the inventory (e.g., whether an item is available).

The sales module 126 may analyze the sales data 132 to determine sales metrics that can be used as factors by the encumbrance module 122. The sales module 126 may determine sales rates of items for a time period, such as an average sales rate over the last 30 days, over a day, during a time of day, during a day of the week (e.g., on Mondays (and/or other days of the week), and/or combinations thereof. The sales module 126 may use historical sales data, sales forecast data, or both to determine the sales rates. In some embodiment, the sales module 126 may include information for each unique item. However the sales information may also be rolled up to higher level groupings to include a sales rate for a group of items, such as a category of items, and so forth.

The user analysis module 128 may analyze the user data 132 to determine user metrics and/or information that can be used as factors by the encumbrance module 122. The user analysis module 128 may determine information about the user, such as whether the user has any special privileges or qualifies for special privileges. For example, the user may have special privileges, which the user may pay for (e.g., subscription-based, etc.) or receive for other reasons (e.g., loyalty, etc.), that may be used to influence when inventory is encumbered. The user analysis module 128 may determine metrics for a user, such as an abandonment rate, a shipping preference, and/or other metrics that may influence encumbrance of an item. For example, if a user typically selects economy shipping, than the seller 102 has more time for fulfillment and may have more time to obtain inventory. In this example, the seller 102 may encumber inventory later in the transaction, and thus provide optimistic encumbrance. In some embodiments, the user analysis module 128 may enable the user to purchase or otherwise obtain an option to encumber an item at a certain triggering event and/or for an amount of time. For example, the user may agree to pay a small amount of money to hold an item, and thus encumber the item, for the user for predetermined amount of time.

Figure 2:
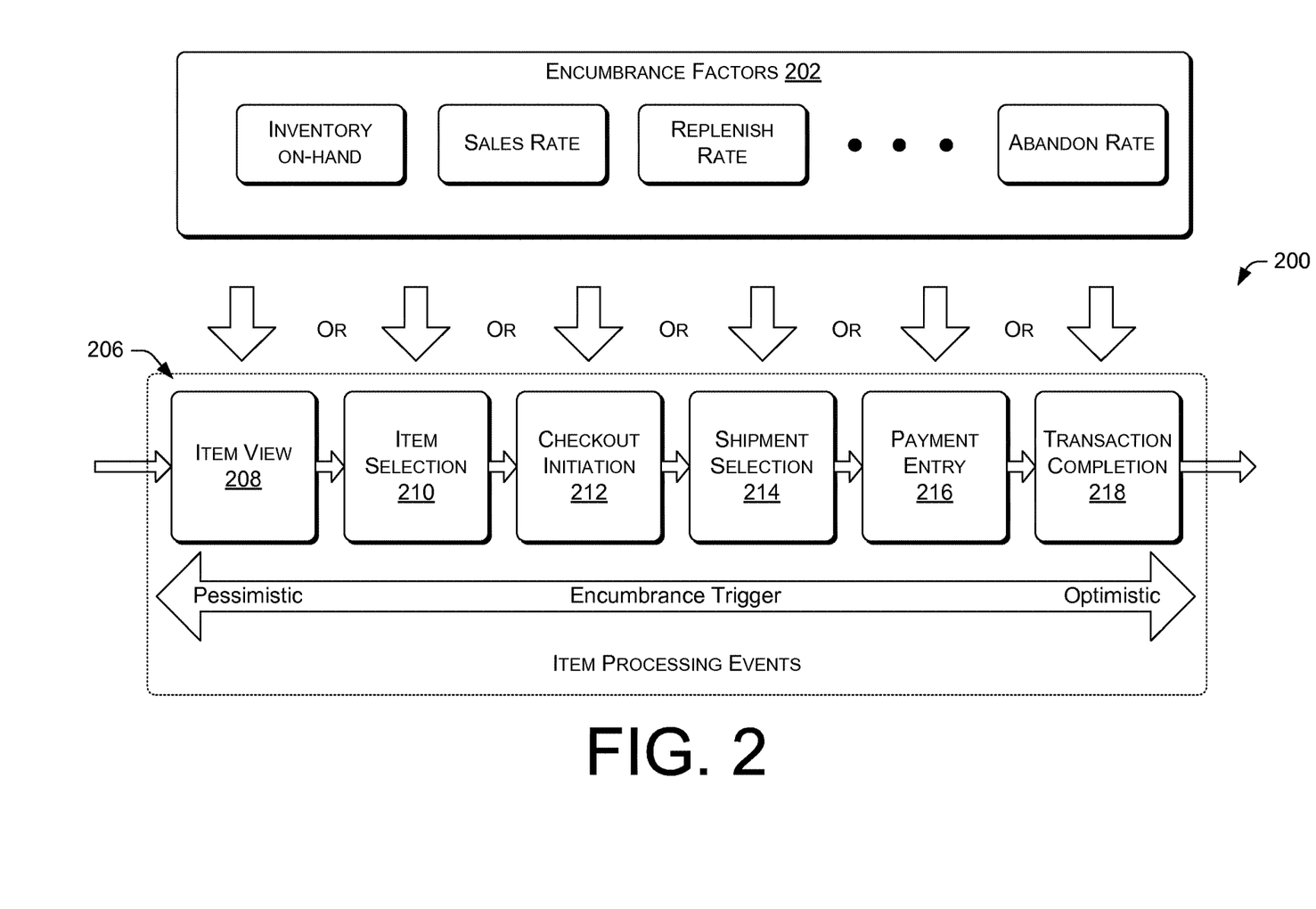
FIG. 2 is a schematic diagram showing an item processing timeline and various factors that may determine a triggering event of item processing events where the occurrence of the triggering event initiates encumbrance of inventory of an item.

FIG. 2 is a schematic diagram showing an item processing timeline 200 and various factors that may determine a triggering event from events along the item processing timeline, referred to herein as a transaction. The occurrence of the triggering event may initiate encumbrance of inventory of an item. As the factors change, the triggering event may be dynamically updated and may be updated to be a different triggering event for a particular item, for a particular time, and so forth.

Various factors 202 may be based on data extracted by the inventory module 124, the sales module 126, and/or the user analysis module 128. Examples of the factors may include on-hand inventory, rate of sales, replenishment rates of inventory, and/or abandonment rates of transactions; however, many other types of factors may also be employed. The combination of one or more of the factors 202 may be used by the encumbrance module 122 to determine a triggering event of events within the item processing timeline 200. Example events 206 that occur in the item processing timeline 200 may include an item view event 208, an item selection event 210, a checkout initiation event 212, a shipment selection event 214, a payment event 216, and a transaction completion event 218. However, more or fewer events may also be included in the item processing timeline 200. Each event is discussed in turn. As discussed herein, the encumbrance module 122 may encumber inventory of an item at the start of a triggering event or at some point during the triggering event (e.g., at the end of the event, after an elapse of time, etc.).

The item view event 208 may include a page view or other initial viewing of an item. In some instances, the inventory of an item may be encumbered at this relatively early stage in a transaction process, such as when the seller 102 only offers few items or expects items to be sold very quickly.

The item selection event 210 may include a selection of an item for an order. In some instances, the item selection event may cause an item to be added to an order, added to a virtual shopping cart, and/or otherwise designated for further processing.

The checkout initiation event 212 may include an initiation of conducting a transaction to complete an order. The checkout initiation may direct the user to a new page and/or provide new information for the user to complete to process the transaction.

The shipment selection event 214 may include a request for shipping information and/or entry or selection of shipping information by the user. The shipment selection may also include selection of a type of shipping, such as economy shipping, express shipping, two-day shipping, one-day shipping, and so forth.

The payment event 216 may include a request for shipping information and/or entry or selection of shipping information by the user.

The transaction completion event 218 may include completion of the transaction, such as verification of payment funds, and/or other processing of the transaction. In some embodiments, other events may be used to trigger encumbrance, such as an item browse/search event, saving an item to a list, and so forth.

As indicated in FIG. 2, encumbrance at events occurring at the later stages of the item processing timeline 200 are optimistic encumbrance while the encumbrance at events occurring at the earlier stages of the item processing timeline 200 are pessimistic encumbrance. The duration of the encumbrance may be a fixed amount of time, a dynamically determined amount of time (discussed further with reference to FIG. 4, or based on a termination event, such as a cancelation of a transaction or other type of event.

Illustrative Operation

FIGS. 3-6 are flow diagrams of illustrative processes to dynamically encumber items. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes are described with reference to the environment 100. Of course, the processes may be performed in other similar and/or different environments.

Figure 3:
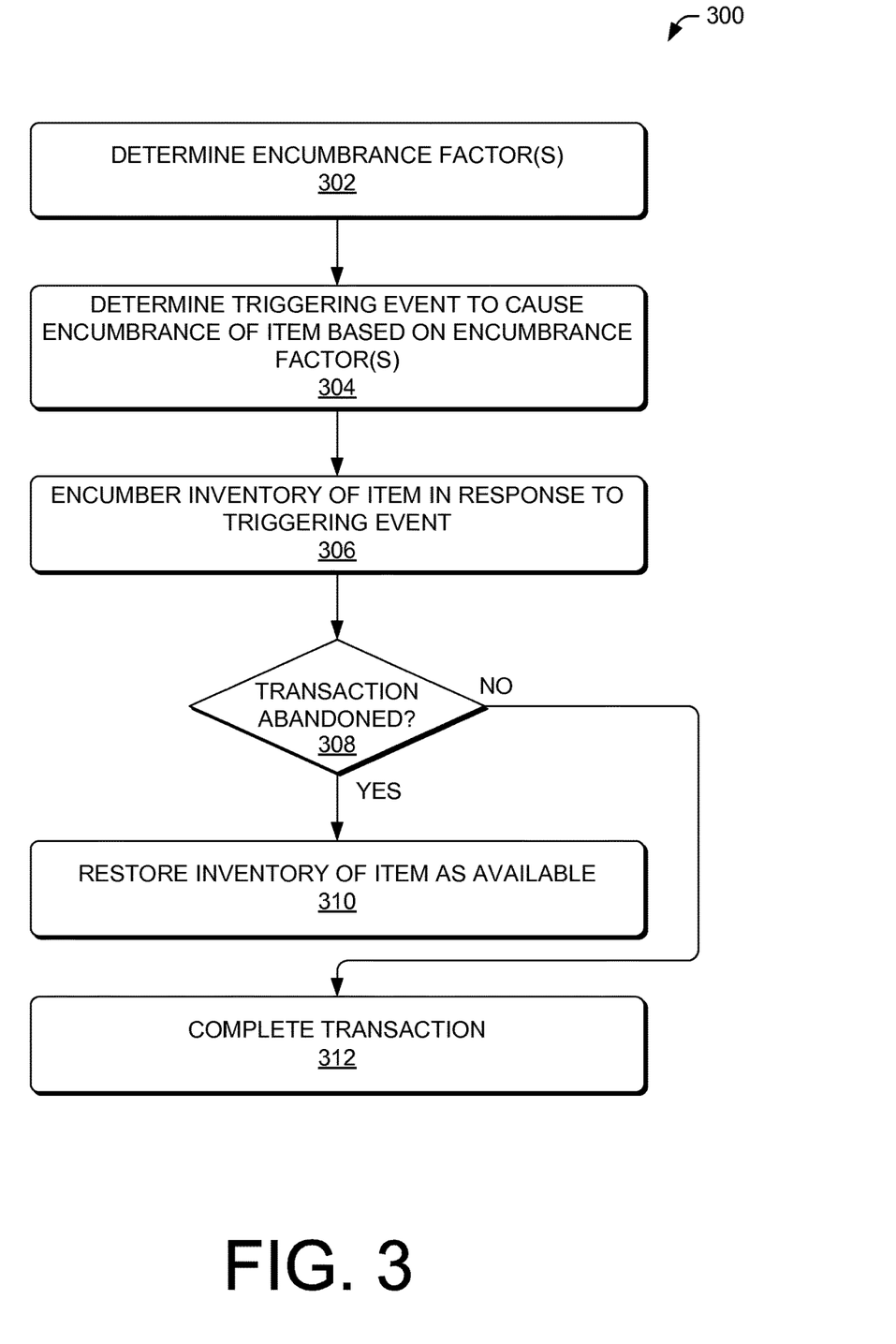
FIG. 3 is a flow diagram of an illustrative process to determine a triggering event to initiate encumbrance of inventory of an item based at least partly on inventory on-hand and/or sales information.

FIG. 3 is a flow diagram of an illustrative process 300 to determine a triggering event to initiate encumbrance of inventory of an item based at least partly on on-hand inventory and/or sales information.

At 302, the inventory module 124 may determine one or more encumbrance factor(s) for an item. In some embodiments, an encumbrance factor may be a current on-hand inventory for an item. The inventory module 124 may maintain current on-hand inventory in the inventory data 130 or may analyze the inventory data and possibly other data (e.g., the sales data 132) to determine the current on-hand inventory. The current on-hand inventory may be an accurate inventory of unclaimed items or unsold items at a point in time. These items may be encumbered, as discussed herein. In various embodiments, an encumbrance factor may be a rate of sales for an item. The sales module 126 may determine the rate of sales for an item. The rate of sales may be based completely on historical information or may be a forecasted value. The sales module 126 may maintain one or more tables or other data repositories to store the rates of sales in the sales data 132 or may analyze the sales data 132 and possibly other data to determine the rate of sales for an item. The rate of sales may be for a period of time, and may be specific to a particular day (e.g., day of the week, day of the year, etc.), time of day, and so forth. In some embodiments, the rate of sales may be based on other data, such as data correlated with customer purchase. For example, weather data may be used to determine an accurate or predicted rate of sales of air conditioners or umbrellas. Other possible encumbrance factors are described above as the encumbrance factors 202.

At 304, the encumbrance module 122 may determine a triggering event to cause encumbrance of the item based on the one or more encumbrance factor(s) determined at the operation 302. For example, the encumbrance module 122 may dynamically select a triggering event from a plurality of events that occur in a transaction based on updated data determined at the operations 302. For example, as items sell and current on-hand inventory is lowered, the encumbrance module 122 may modify or select a different triggering event than a previously used triggering event when the encumbrance factors include current on-hand inventory and/or the rate of sales information. As an example, when current on-hand inventory is low (e.g., few available items), and the rate of sales is high (e.g., many items sold per hour), then the encumbrance module 122 may determine to provide pessimistic encumbrance and select a triggering event that is an event that occurs early in a transaction of an item, such as when an item is added to an order or virtual cart. Of course, the seller 102 may have other preferences and encumber inventory at different times for different types of information or factors.

At 306, the encumbrance module 122 may detect occurrence of the triggering event and encumber inventory of the item in response to the occurrence of the triggering event. In the example, above, the item may be encumbered when added to an order when pessimistic encumbrance is employed, but may be encumbered when a transaction is completed when optimistic encumbrance is employed.

At 308, the encumbrance module 122 may determine whether the item is abandoned in a transaction. The transaction may be determined to be abandoned by action or inaction by the user. For example, the user may cancel an order before it is completed, which may cause an abandonment of the transaction, or the user may remove an item from an order, which may cause partial abandonment of the transaction (e.g., abandonment of the item). In another example, the user may stop entering data, and may leave a page used to complete the transaction. Here, the transaction may be designated as abandoned due to an elapse of time with no further action by the user 104.

When the item is determined to be abandoned in a transaction (following the "yes" route from the decision operation 308), then the process 300 may advance to an operation 310. At 310, the encumbrance module 122 (or possibly the inventory module 124) may restore inventory of the item as currently available inventory that can be consumed or encumbered for another customer.

When the item is not determined to be abandoned in a transaction (following the "no" route from the decision operation 308), then the process 300 may advance to an operation 312. At 312, the transaction may be completed, and thus the sales data 132 and/or the inventory data 130 may be updated to reflect the sale of the item.

The process 300 may be applied to physical items, as described above, and also to services, or other items, such as items offered via an electronic marketplace, groceries, daily deals, installation services, distribution of electronic and digital media (e.g., music, videos, electronic books (eBooks), games, etc.), coupons, storage space, bandwidth (digital and/or physical), and so forth. For example, when the item is installation by a person, the inventory and encumbrance may be associated with available time slots for the person to perform the installation. When the item involves a delivery, the inventory and encumbrance may be associated with available time slots to perform the delivery. Thus, encumbrance may include reserving, at least temporarily, slots to perform work, provide deliveries, provide streaming media, and so forth.

Figure 4:
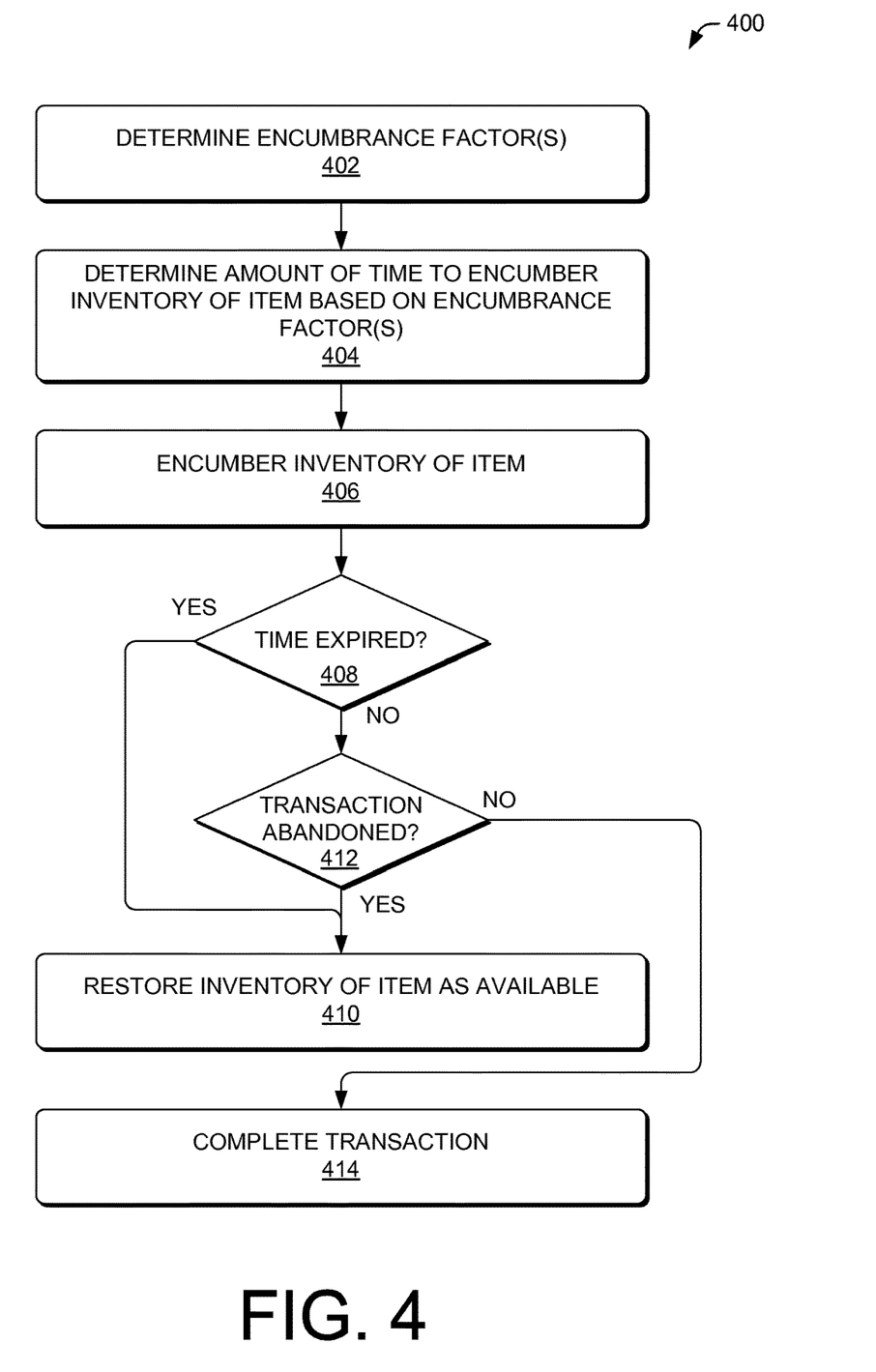
FIG. 4 is a flow diagram of an illustrative process to determine an amount of time to encumber inventory of an item based at least partly on on-hand inventory and/or sales information.

FIG. 4 is a flow diagram of an illustrative process 400 to determine an amount of time to encumber inventory of an item based at least partly on inventory on-hand and/or sales information.

At 402, the inventory module 124 may determine one or more encumbrance factor(s) for an item. In some embodiments, an encumbrance factor may be a current on-hand inventory for an item. The inventory module 124 may maintain current on-hand inventory in the inventory data 130 or may analyze the inventory data and possibly other data (e.g., the sales data 132) to determine the current on-hand inventory. The current on-hand inventory may be an accurate inventory of unclaimed items or unsold items at a point in time. These items may be encumbered, as discussed below. In various embodiments, an encumbrance factor may be a rate of sales for an item. The sales module 126 may determine a rate of sales for an item. The rate of sales may be based completely on historical information or may be a forecasted value. The sales module 126 may maintain one or more tables or other repositories to store the rates of sales in the sales data 132 or may analyze the sales data 132 and possibly other data to determine the rate of sales for an item. The rate of sales may be for a period of time, and may be specific to a particular day (e.g., day of the week, day of the year, etc.), time of day, and so forth. In some embodiments, the rate of sales may be based on other data, such as data correlated with customer purchase. Other possible encumbrance factors are described above as the encumbrance factors 202.

At 404, the encumbrance module 122 may determine an amount of time (e.g., a duration of time) to encumber inventory of an item based on the one or more encumbrance factor(s) determined at the operation 402. For example, the encumbrance module 122 may dynamically select an amount of time to encumber an item based on updated data determined at the operations 402. For example, as items sell and current on-hand inventory is lowered, the encumbrance module 122 may modify or select a different amount of time (e.g., duration) for encumbering an item when the encumbrance factors include current on-hand inventory and/or the rate of sales information. After expiration of the encumbrance time, the item may be again made available to other customers. As an example, when current on-hand inventory is low (e.g., few available items), and the rate of sales is high (e.g., many items sold per hour), then the encumbrance module 122 may select a shorter amount of time for encumbrance than when inventory is high, and so forth. Of course, the seller 102 may have other preferences and encumber inventory for different amounts of time for different types of information or factors.

At 406, the encumbrance module 122 may encumber inventory of the item and start tracking time of the encumbrance. The inventory may be encumbered up to the amount of time determined at the operation 404. For example, the encumbrance may be prematurely terminated by purchase of the item, termination of a transaction, and so forth.

At 408, the encumbrance module 122 may determine whether the amount of time determined at the operation 404 has expired. When the amount of time expires (following the "yes" route from the decision operation 408), then the process 400 may advance to an operation 410. At 410, the encumbrance module 122 (or possibly the inventory module 124) may restore inventory of the item as currently available inventory that can be consumed by another user or encumbered for another user. When the amount of time is not expired (following the "no" route from the decision operation 408), then the process 400 may advance to an operation 412.

At 412, the encumbrance module 122 may determine whether the item is abandoned in a transaction. The transaction may be determined to be abandoned by action or inaction by the user or system. For example, the user may remove an item from an order, which may cause partial abandonment of the transaction (e.g., abandonment of the item). In another example, the user may stop entering data, and may navigate away from a page used to complete the transaction. In yet another example, the merchant may cancel the transaction.

When the item is determined to be abandoned in a transaction (following the "yes" route from the decision operation 412), then the process 400 may advance to the operation 410. At 410, the encumbrance module 122 (or possibly the inventory module 124) may restore inventory of the item as currently available inventory that can be consumed or encumbered for another customer.

When the item is not determined to be abandoned in a transaction (following the "no" route from the decision operation 412), then the process 400 may advance to an operation 414. At 414, the transaction may be completed, and thus the sales data 132 and/or the inventory data 130 may be updated to reflect the sale of the item. By determining if the transaction is abandoned, the seller 102 may make an item available to other users more quickly in some instances than by waiting for the time to expire (via the decision operation 408). However, some embodiments may rely on the expiration of time to make the item available to other users.

The concepts discussed in the processes 300 and 400 may be combined to provide encumbrance at a dynamically determined triggering event for a dynamically determined amount of time, where one or both of the triggering event and the amount of time are dynamically determined by the encumbrance module 122.

Figure 5:
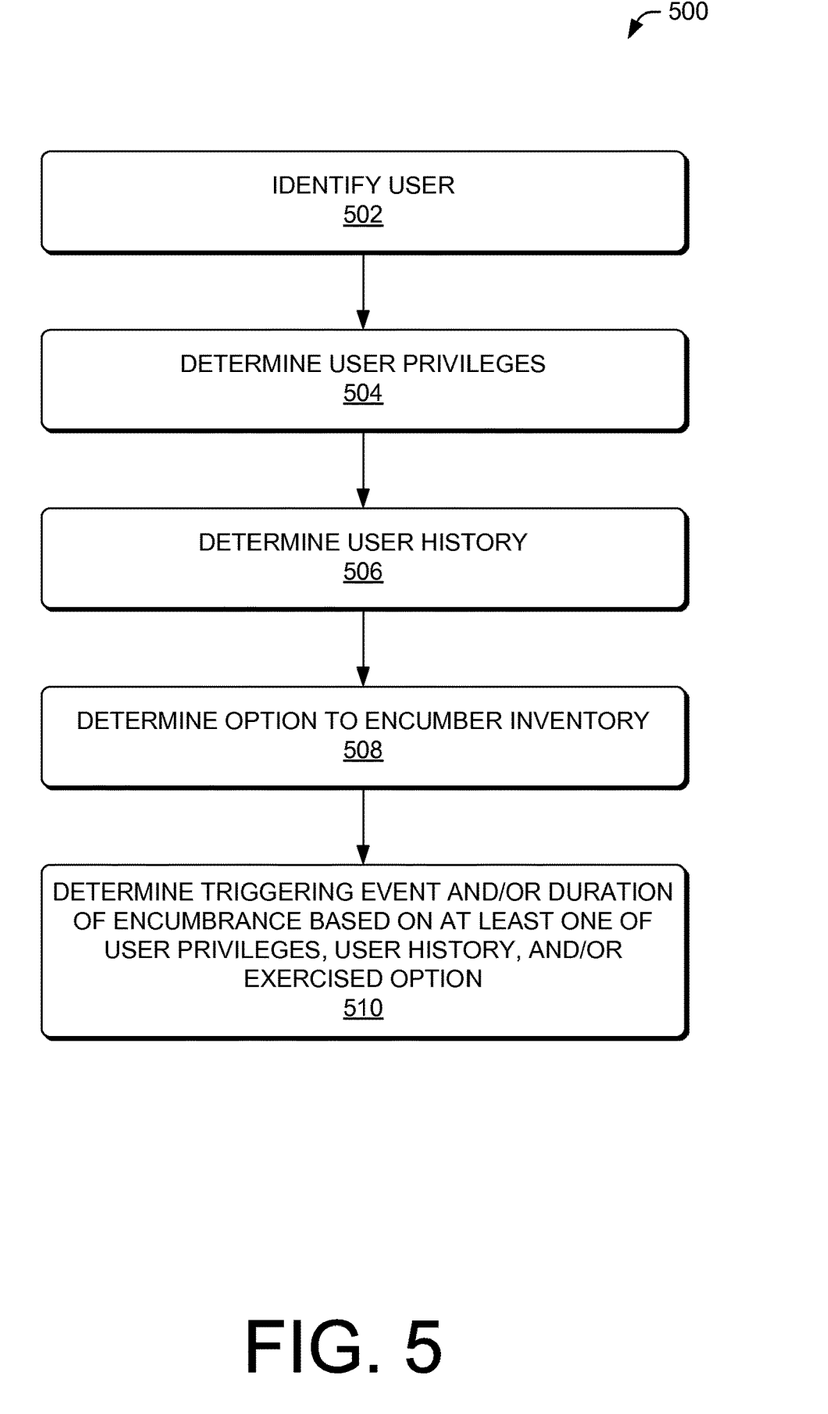
FIG. 5 is a flow diagram of an illustrative process to determine a triggering event to initiate encumbrance of inventory of an item based at least partly on user-based information.

FIG. 5 is a flow diagram of an illustrative process 500 to determine a triggering event to initiate encumbrance of inventory of an item based at least partly on user-based information.

At 502, the user analysis module 128 may identify a user. The user analysis module 128 may identify the user based on log in information, cookies or otherwise stored identification information, or by other known techniques. In some embodiments, the identity of the user may only be known for a short period of time, such as during a user's interaction with an electronic marketplace for a single session. Thus, in this situation, the identification may only associate the user with actions and user data that are captured during the session.

At 504, the user analysis module 128 may determine any user privileges that are available based on the identity of the user determined at the operation 502. For example, the user may have loyalty privileges, subscription privileges, and/or other types of privileges that qualify the user for special benefits, such as encumbrance of items at an earlier point during a transaction and/or for a longer period of time to help guarantee inventory for the user. The user privileges may be stored in the user data 134.

At 506, the user analysis module 128 may determine user history associated with the user. The user history may be analyzed to determine and quantify purchasing patterns, abandonment rates, shipping preferences, and/or other types of information that may assist the encumbrance module 122 to determine a triggering event and/or an amount of time for encumbrance as discussed above with respect to the processes 300 and 400. The user history may be stored in the user data 134. For example, the user history may indicate that a user typically selects economy shipping, which means the seller 102 has more time for fulfillment and may have more time to obtain inventory. In this example, the seller 102 may encumber inventory later in the transaction.

At 508, the user analysis module 128 and/or the encumbrance module 122 may allow the user 104 to purchase, request, or otherwise obtain an option to encumber inventory of an item. For example, the user analysis module 128 may allow the user to obtain an option based on the user privileges determined at the operation 504 and/or based on the analysis of the user history determined at the operation 506. The option may allow the user to encumber inventory for a period of time or for a longer period of time, which may even extend pass a current session (e.g., may allow the user to log back in at a later time and complete the purchase). The option may also cause encumbrance at an earlier triggering event.

At 510, the encumbrance module 122 may determine a triggering event and/or an amount of time for encumbrance based on at least one of user privileges, user history, and/or an exercised option. Thus, the encumbrance module 122 may apply output of the operation 504, the operation 506, and/or the operation 508 to determine the triggering event and/or an amount of time to encumber inventory of an item.

Figure 6:
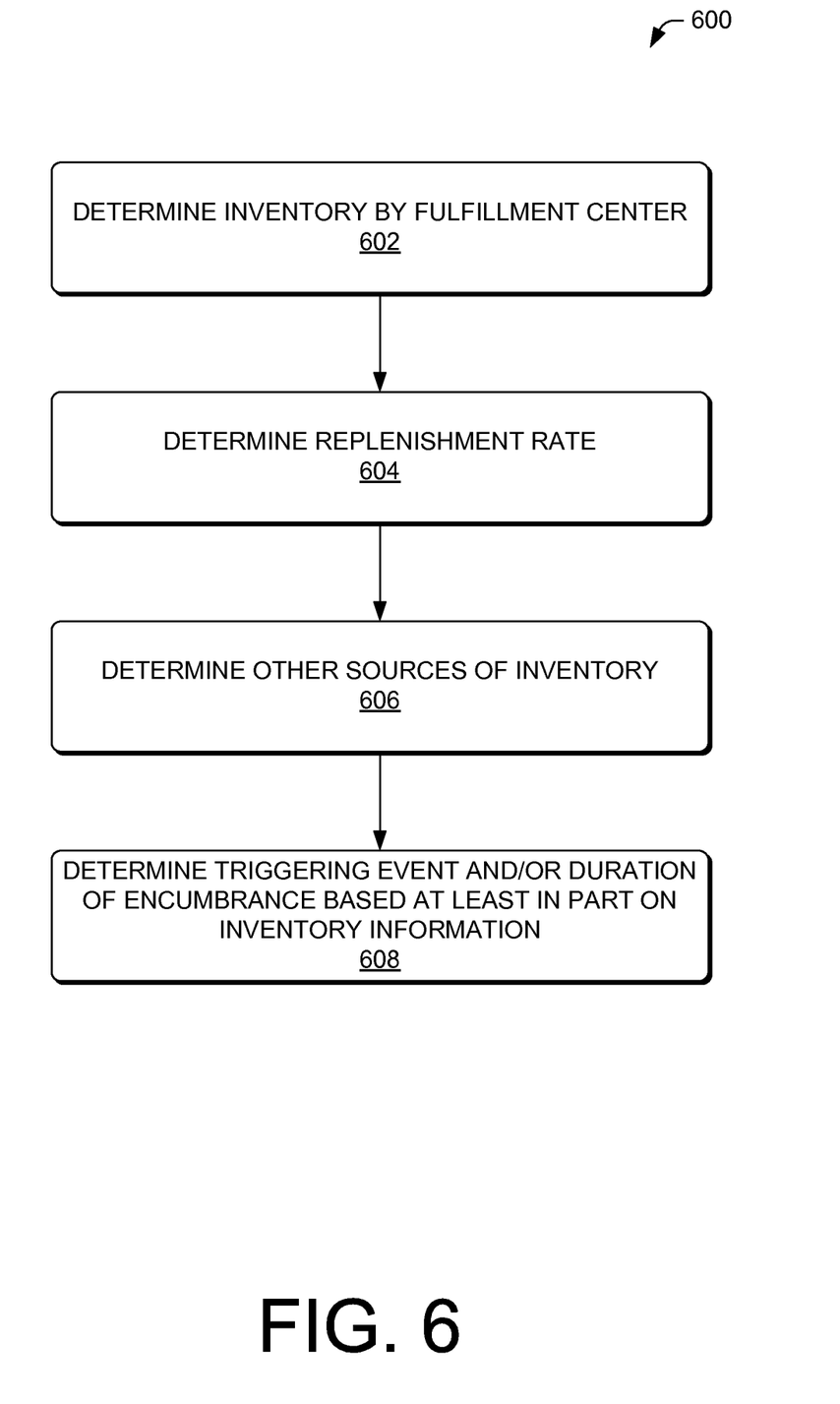
FIG. 6 is a flow diagram of an illustrative process to determine a triggering event to initiate encumbrance of inventory of an item based at least partly on inventory information.

FIG. 6 is a flow diagram of an illustrative process 600 to determine a triggering event to initiate encumbrance of inventory of an item based at least partly on inventory information.

At 602, the inventory module 124 may determine current on-hand inventory available from the fulfillment center 110, and possibly from each fulfillment center location 110(1)-(N) (e.g., number of items available at each FC). The inventory module 124 may maintain current on-hand inventory in the inventory data 130 or may analyze the inventory data and possibly other data (e.g., the sales data 132) to determine the current on-hand inventory. The current on-hand inventory may be an accurate inventory of unclaimed items or unsold items at a point in time.

At 604, the inventory module 124 may determine a replenishment rate of inventory. The replenishment rate may indicate when a particular quantity of new inventory is expected to arrive to replenish current inventory (e.g., X units to be received in Y days, etc.). This information may be used to adjust encumbrance of inventory, especially when the encumbrance module 122 expects non-expedited shipping (e.g., economy shipping, etc.) to users, and thus when the seller 102 can wait until the inventory is replenished to ship an item.

At 606, the inventory module may determine other sources of inventory that may be otherwise undesirable for use to fulfill an item. Examples of other sources of inventory may include comingled inventory, which may be inventory of items stored at the fulfillment center 110 or at another location, but that are owned or controlled, at least partially, by another entity other than the seller 102. Another example of other sources of inventory may include inventory available directly from the suppliers 112, which may not be processed as replenished inventory, but instead may be fulfilled directly from the suppliers 112. These other sources of inventory may enable the seller 102 to provide an item to the user in a situation of an oversell, which may result from optimistic encumbrance (encumbering items too late in a transaction such that no inventory is left once the customer completes the transaction, etc.). Thus, the seller 102 may still be able to fulfill the item, possibly via another source (e.g., the suppliers 112, etc.), and possibly at a greater cost to the seller 102.

At 608, the encumbrance module 122 may determine a triggering event and/or an amount of time to encumber an item based at least in part on inventory information. The inventory information may be obtained from the operation 602, the operation 604, and/or the operation 606.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining, by one or more of a set of computing devices, one or more factors associated with encumbering an item that is available for consumption using an online marketplace, the one or more factors including at least an inventory level associated with the item;
   dynamically determining, by one or more of the set of computing devices, a triggering event to cause encumbrance of at least a portion of an inventory associated with the item based at least in part on the one or more factors;
   receiving, by one or more of the set of computing devices, data indicating an interaction with an electronic device, the interaction being associated with a transaction for the item using the electronic marketplace;
   determining, by one or more of the set of computing devices, that the triggering event occurs based at least in part on the interaction; and
   based at least in part on the determining that the triggering event occurs, encumbering, by one or more of the set of computing devices, at least the portion of the inventory associated with the item, wherein the encumbering of the at least the portion of the inventory associated with the item causes the at least the portion of the inventory associated with the item to be at least temporarily unavailable for consumption using the electronic marketplace.

2. The method as recited in claim 1, wherein the inventory level of the item includes a quantity of the item that a merchant has authority to distribute and that are not encumbered, and wherein the item is at least one of a physical product, a service, or a digital item.

3. The method as recited in claim 1, further comprising determining an expected replenishment of the inventory level, and wherein the one or more factors further include the expected replenishment of the inventory level.

4. The method as recited in claim 1, further comprising determining an availability of at least one other source of inventory of the item that can be used to fulfill an order of the item, the at least one other source of inventory being located in a different location than a location of the inventory of the item or being owned by a different entity than an entity associated with the inventory of the item, and wherein the one or more factors further include the availability of at least one other source of inventory of the item.

5. The method as recited in claim 1, further comprising determining, based at least in part on the one or more factors, an amount of time to encumber the at least the portion of the inventory associated with the item after which the at least the portion of the inventory associated with the item is made available for consumption using the electronic marketplace.

6. The method as recited in claim 1, further comprising determining a privilege associated with a customer, and wherein the one or more factors further include the privilege of the customer.

7. The method as recited in claim 1, further comprising determining a rate of consumption of the item and an abandonment rate of transactions involving the item, and wherein the one or more factors further include the rate of consumption of the item and the abandonment rate of transactions involving the item.

8. One or more non-transitory computer-readable media storing computer-executable instructions that, when executed on one or more processors, performs acts comprising:
   determining an inventory level associated with an item that is available for consumption using an electronic marketplace;
   dynamically determining an amount of time to maintain encumbrance of at least a portion of an inventory associated with the item based at least in part on the inventory level of the item;
   receiving data indicating an interaction with an electronic device, the interaction being associated with a transaction for the item using the online marketplace;
   determining that a triggering event has occurred based at least in part on the transaction; and
   based at least in part on the triggering event occurring, encumbering the at least the portion of the inventory of the item, the encumbering of the at least the portion of the inventory associated with the item to cause the at least the portion of the inventory associated with the item to be unavailable for consumption using the electronic marketplace for no longer than the amount of time.

9. The one or more non-transitory computer-readable media as recited in claim 8, wherein the acts further comprise designating the at least the portion of the inventory associated with the item as available for consumption using the electronic marketplace after expiration of the amount of time in response to cancelation of the transaction involving the item.

10. The one or more non-transitory computer-readable media as recited in claim 9, wherein the acts further comprise dynamically determining the triggering event based at least in part on the inventory level associated with the item.

11. The one or more non-transitory computer-readable media as recited in claim 8, wherein the acts further comprise determining a privilege associated with a customer, and wherein the dynamically determining the amount of time to maintain encumbrance of the at least the portion of the inventory associated with the item is further based at least in part on the privilege of the customer.

12. The one or more non-transitory computer-readable media as recited in claim 8, wherein the acts further comprise determining a rate of sales of the item and an abandonment rate of transactions involving the item, and wherein the dynamically determining the amount of time to maintain encumbrance of the at least the portion of the inventory associated with the item is further based at least in part on the rate of sales of the item and the abandonment rate of transactions involving the item.

13. The one or more non-transitory computer-readable media as recited in claim 8, wherein the acts further comprise determining an expected replenishment of the inventory level, and wherein the dynamically determining the amount of time to maintain encumbrance of the at least the portion of the inventory associated with the item is further based at least in part on the expected replenishment of the inventory level.

14. The method as recited in claim 1, wherein the receiving the data indicating the interaction with the electronic device comprises at least one of:
   receiving, by the one or more of the set of computing devices, first data indicating a viewing of the item by the electronic device;
   receiving, by the one or more of the set of computing devices, second data indicating a selection of the item by the electronic device; or
   receiving, by the one or more of the set of computing devices, third data indicating that the transaction has been complete by the electronic device.

15. The method as recited in claim 1, further comprising:
   determining, based at least in part on the data, a type of the interaction; and
   determining an amount of time to encumber the at least the portion of the inventory associated with the item based at least in part on the type of the interaction.

16. One or more computing devices comprising:
   one or more processors; and
   one or more computer-readable media storing instructions that, when executed by the one or more processors, cause the one or more computing devices to perform acts comprising:
      determining an inventory level associated with an item that is available for consumption using an electronic marketplace;
      dynamically determining a triggering event to cause encumbrance of at least a portion of an inventory associated with the item based at least in part on the inventory level associated with the item;
      receiving data indicating an interaction with an electronic device, the interaction being associated with a transaction for the item using the electronic marketplace;
      determining that the triggering event occurs based at least in part on the interaction; and
      based at least in part on the determining the triggering event occurs, encumbering at least the portion of the inventory associated with the item, wherein the encumbering of the at least the portion of the inventory associated with the item causes the at least the portion of the inventory associated with the item to be at least temporarily unavailable for consumption using the electronic marketplace.

17. The one or more computing devices as recited in claim 16, wherein the inventory level of the item includes a quantity of the item that a merchant has authority to distribute and that are not encumbered, and wherein the item is at least one of a physical product, a service, or a digital item.

18. The one or more computing devices as recited in claim 16, the acts further comprising determining an expected replenishment of the inventory level, and wherein the dynamically determining the triggering event to cause the encumbrance is further based at least in part on the expected replenishment of the inventory level.

19. The method as recited in claim 1, further comprising:
   determining, by one or more of a set of computing devices, one or more additional factors associated with encumbering the item that is available for consumption using the online marketplace; and
   dynamically determining, by one or more of the set of computing devices, an additional triggering event to cause encumbrance of at least an additional portion of the inventory associated with the item based at least in part on the one or more additional factors, the additional triggering event being different than the triggering event.

20. The one or more computing devices as recited in claim 16, wherein the receiving the data indicating the interaction with the electronic device comprises at least one of:
   receiving first data indicating a viewing of the item by the electronic device;
   receiving second data indicating a selection of the item by the electronic device; or
   receiving third data indicating that the transaction has been complete by the electronic device.

\* \* \* \* \*